US011005328B2

(12) United States Patent
Horii et al.

(10) Patent No.: US 11,005,328 B2
(45) Date of Patent: May 11, 2021

(54) MOTOR

(71) Applicant: Nidec Corporation, Kyoto (JP)

(72) Inventors: Yuya Horii, Kyoto (JP); Kohei Kurazono, Kyoto (JP); Tsuyoshi Yasumura, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 493 days.

(21) Appl. No.: 16/028,459

(22) Filed: Jul. 6, 2018

(65) Prior Publication Data

US 2019/0020241 A1 Jan. 17, 2019

(30) Foreign Application Priority Data

Jul. 14, 2017 (JP) .............................. JP2017-138130

(51) Int. Cl.
*H02K 5/16* (2006.01)
*H02K 5/173* (2006.01)
*H02K 15/14* (2006.01)
*H02K 1/18* (2006.01)
*H02K 1/16* (2006.01)
*F16C 25/06* (2006.01)
*H02K 21/22* (2006.01)
(Continued)

(52) U.S. Cl.
CPC .............. *H02K 5/163* (2013.01); *F16C 25/06* (2013.01); *F16C 35/067* (2013.01); *H02K 1/16* (2013.01); *H02K 1/185* (2013.01); *H02K 1/187* (2013.01); *H02K 15/14* (2013.01); *H02K 21/22* (2013.01); *F16C 25/083* (2013.01); *F16C 2380/26* (2013.01); *H02K 5/16* (2013.01); *H02K 5/161* (2013.01); *H02K 5/1735* (2013.01)

(58) Field of Classification Search
USPC ...................................................... 310/89, 90
See application file for complete search history.

(56) References Cited

U.S. PATENT DOCUMENTS 5,663,604 A * 9/1997 Takahashi .............. H02K 1/187
310/62
8,824,096 B1 * 9/2014 Akiyama ............... H02K 7/003
360/99.08
(Continued)

FOREIGN PATENT DOCUMENTS

CN 1549424 A 11/2004
CN 102170213 A 8/2011
(Continued)

*Primary Examiner* — Gary A Nash
(74) *Attorney, Agent, or Firm* — Keating & Bennett, LLP

(57) ABSTRACT

A motor includes a bearing housing, a stator, and a fixing member. The stator includes a stator core, an insulator, and a lead. The insulator is an insulating body that covers at least a portion of the stator core. The lead is wound around the stator core with the insulator interposed therebetween. The bearing housing includes a first bearing holding portion and a second bearing holding portion that hold two bearings; and an intermediate portion that is positioned between the first bearing holding portion and the second bearing holding portion in the vertical direction. The lower surface of the fixing member is in contact with the upper surface of the stator. The fixing member is fixed at a position opposite the intermediate portion in the radial direction. As a result, the displacement of the stator relative to the bearing housing is suppressed.

13 Claims, 6 Drawing Sheets

(51) Int. Cl.
 *F16C 35/067* (2006.01)
 *F16C 25/08* (2006.01)

(56) References Cited

U.S. PATENT DOCUMENTS

| | | | |
|---|---|---|---|
| 8,946,948 B2* | 2/2015 | Adachi | H02K 5/10 |
| | | | 310/43 |
| 2005/0200211 A1 | 9/2005 | Hsu et al. | |
| 2006/0186744 A1 | 8/2006 | Hsu et al. | |
| 2007/0176504 A1* | 8/2007 | Otsuki | H02K 7/085 |
| | | | 310/90.5 |
| 2007/0273238 A1* | 11/2007 | Nomura | H02K 1/187 |
| | | | 310/216.012 |
| 2011/0187223 A1 | 8/2011 | Higuchi et al. | |
| 2014/0203691 A1* | 7/2014 | Matsumoto | H02K 5/16 |
| | | | 310/425 |
| 2017/0040852 A1 | 2/2017 | Byzio et al. | |

FOREIGN PATENT DOCUMENTS

| | | |
|---|---|---|
| JP | 11-252878 A | 9/1999 |
| JP | 2006-254651 A | 9/2006 |
| JP | 2013-165620 A | 8/2013 |

\* cited by examiner

MOTOR

CROSS REFERENCE TO RELATED APPLICATIONS

This application claims the benefit of priority to Japanese Patent Application No. 2017-138130 filed on Jul. 14, 2017. The entire contents of this application are hereby incorporated herein by reference.

BACKGROUND OF THE INVENTION

1. Field of the Invention

The present invention relates to a motor.

2. Description of the Related Art

There is a known motor that has a structure in which a bearing is held by a cylindrical bearing housing and a stator is fixed to the outer circumferential surface of the bearing housing. A known motor is described in, for example, Japanese Unexamined Patent Application Publication No. 2013-165620.

A motor generates torque by using magnetic attraction force and magnetic repulsive force generated between a stator and a rotor. Thus, the magnetic attraction force and the magnetic repulsive force sometimes cause the stator to vibrate during driving of the motor. The vibration may become a factor of noise. In order to suppress the vibration of a stator, for example, it is conceivable to interpose an elastic adhesive capable of absorbing vibration between a bearing housing and the stator. However, the elastic adhesive requires a long time for curing. Therefore, it is required to suppress the displacement of the position of the stator relative to the bearing housing during curing of the elastic adhesive.

Regardless of the presence/absence of the elastic adhesive, there is a requirement to suppress the displacement of the position of the stator relative to the bearing housing.

SUMMARY OF THE INVENTION

According to an embodiment as an example of the present disclosure, a motor includes a stationary portion and a rotary portion that is supported so as to be rotatable about a vertically extending center axis relative to the stationary portion. The stationary portion includes a cylindrical bearing housing that extends in an axial direction around the center axis; and a stator and a fixing member that are disposed outside the bearing housing in a radial direction. The stator includes a stator core that is a magnetic body, an insulator that is an insulating body that covers at least a portion of the stator core, and a lead that is wound around the stator core with the insulator interposed therebetween. The bearing housing includes a first bearing holding portion and a second bearing holding portion that hold two bearings; and an intermediate portion that is positioned between the first bearing holding portion and the second bearing holding portion in a vertical direction. A lower surface of the fixing member is in contact with an upper surface of the stator. The fixing member is fixed at a position opposite the intermediate portion in the radial direction.

The above and other elements, features, steps, characteristics and advantages of the present disclosure will become more apparent from the following detailed description of the preferred embodiments with reference to the attached drawings.

DETAILED DESCRIPTION OF THE PREFERRED EMBODIMENTS

Hereinafter, an embodiment as an example of the present disclosure will be described with reference to the drawings. In the present disclosure, the direction parallel to the center axis of a motor, the direction perpendicular to the center axis of the motor, and the direction along a circular arc with the center axis of the motor as the center thereof are referred to as the "axial direction", the "radial direction", and the "circumferential direction", respectively. In addition, in the present disclosure, the shape or the positional relationship of each component will be described on the basis of the axial direction being the vertical direction and a side where a fixing member is disposed with respect to a stator core being the upper side. However, the vertical direction is thus defined merely for convenience of description, and orientations of the motor according to the present disclosure during manufacturing and usage thereof are not limited by the definition.

In the present disclosure, the "parallel direction" includes a substantially parallel direction. In addition, in the present disclosure, the "perpendicular direction" includes a substantially perpendicular direction.

Figure 1:
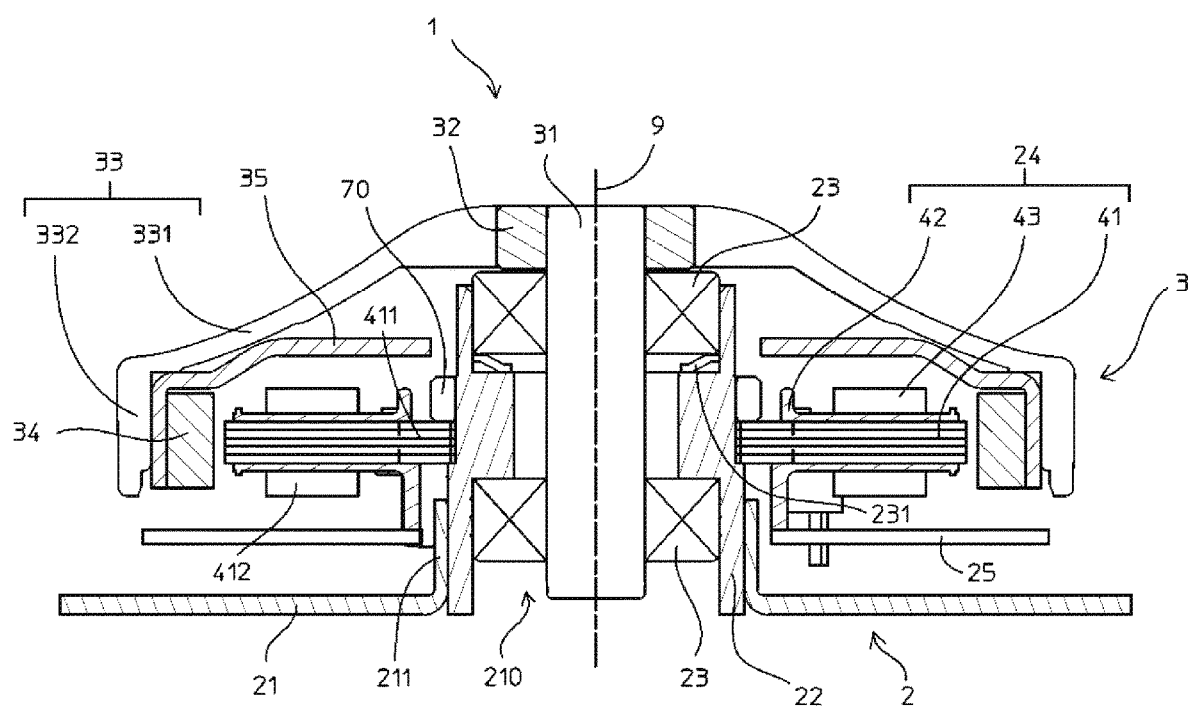
FIG. 1 is a longitudinal sectional view of a motor.
Figure 2:
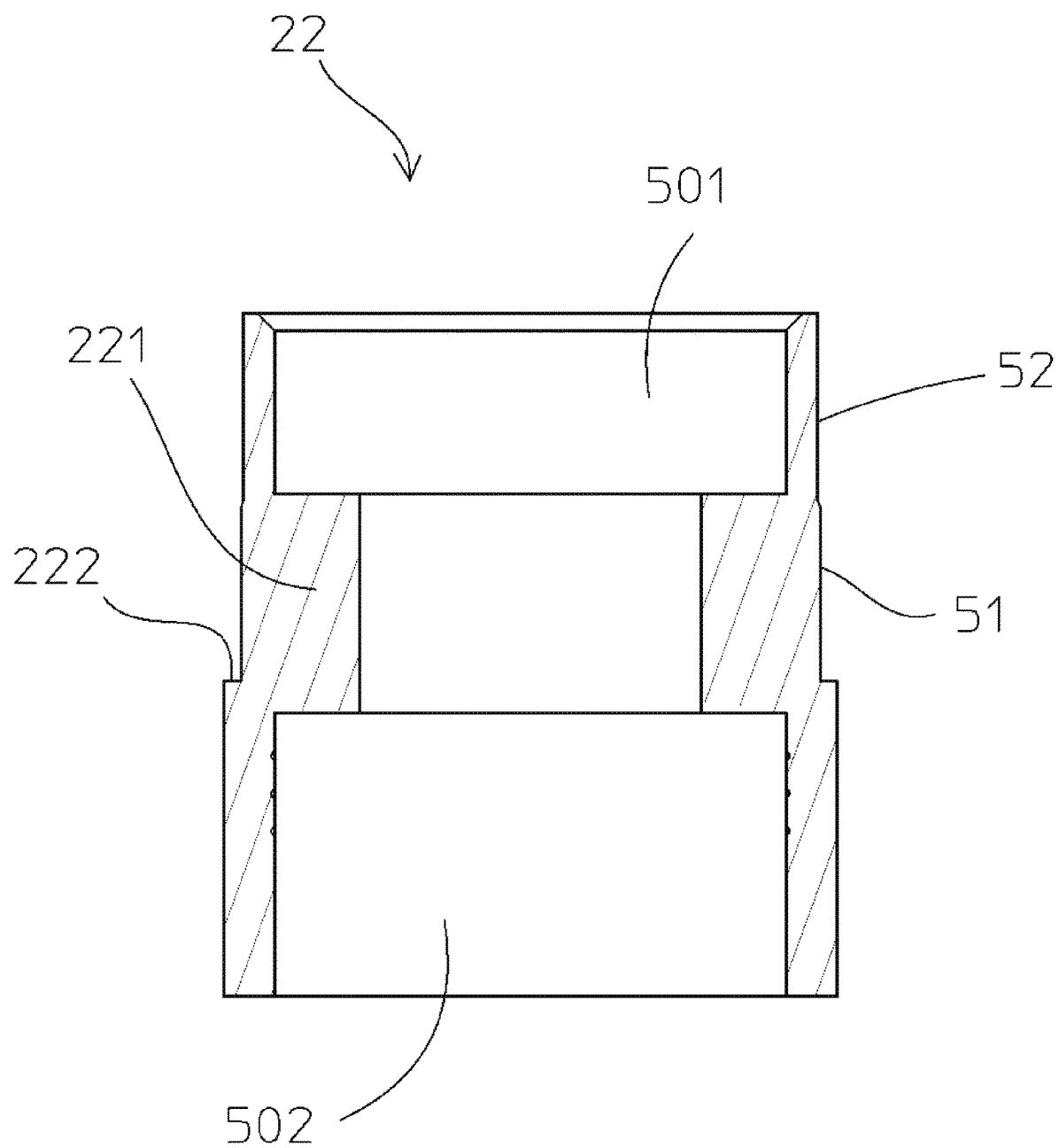
FIG. 2 is a longitudinal sectional view of a bearing housing.

FIG. 1 is a longitudinal sectional view of a motor 1 according to one embodiment as an example of the present disclosure. FIG. 2 is a longitudinal sectional view of a bearing housing 22. As illustrated in FIG. 1, the motor 1 includes a stationary portion 2 and a rotary portion 3. The stationary portion 2 is fixed to a frame body of a machine (hereinafter referred to as the "real machine") on which the motor 1 is mounted. The rotary portion 3 is supported so as to be rotatable relative to the stationary portion 2.

The stationary portion 2 according to the present embodiment includes a base plate 21, the bearing housing 22, a pair of bearings 23, a stator 24, a circuit board 25, and a fixing member 70.

The base plate 21 is a plate-shaped member that extends perpendicularly relative to a center axis 9. The base plate 21 is fixed to the frame body of the real machine by, for example, screwing. The base plate 21 includes a circular hole 210 at the center thereof. In addition, the base plate 21 includes, at the circumference of the circular hole 210, a cylindrical holding portion 211 that extends upward. A material of the base plate 21 is, for example, metal such as iron. However, the material of the base plate 21 is not limited to metal and may be resin.

The bearing housing 22 is a member that holds the pair of bearings 23. A material of the bearing housing 22 is, for example, metal such as stainless steel, brass, or the like. However, the material of the bearing housing 22 is not limited to metal and may be resin. The bearing housing 22 cylindrically extends in the axial direction around the center axis 9. The lower end portion of the bearing housing 22 is inserted into the circular hole 210 of the base plate 21 and fixed to the holding portion 211.

The pair of two bearings 23 are positioned inside the bearing housing 22 in the radial direction. The bearing housing 22 includes a first bearing holding portion 501 and a second bearing holding portion 502. The first bearing holding portion 501 and the second bearing holding portion 502 are disposed so as to be spaced from each other in the vertical direction. The two bearings 23 are respectively held by the first bearing holding portion 501 and the second bearing holding portion 502. The bearings 23 are, for example, ball bearings. An outer race of each of the bearings 23 is fixed to the inner circumferential surface of the bearing housing 22. An inner race of each of the bearings 23 is fixed to the outer circumferential surface of a shaft 31, which will be described later. In addition, the bearing housing 22 includes an intermediate portion 221 between the first bearing holding portion 501 and the second bearing holding portion 502 in the vertical direction. In the present embodiment, a preload spring 231 is provided between the bearing 23 on the upper side and the intermediate portion 221. The outer race of the bearing 23 on the upper side is pressed in the axial direction by the preload spring 231. As a result, the bearing 23 is positioned in the axial direction.

The stator 24 is an armature that generates a magnetic flux in response to a driving current. The stator 24 is disposed outside the bearing housing 22 in the radial direction. As illustrated in FIG. 1, the stator 24 includes a stator core 41, an insulator 42, and a coil 43.

The stator core 41 is a magnetic body. The stator core 41 is, for example, a laminated steel sheet. The stator core 41 includes a core back 411 that has a circular ring shape and a plurality of teeth 412. The core back 411 is fixed to the outer circumferential surface of the bearing housing 22. The plurality of teeth 412 protrude from the core back 411 outward in the radial direction. The insulator 42 is an insulating body. A material of the insulator 42 is, for example, resin. The insulator 42 covers at least a portion of the stator core 41. The coil 43 is constituted by a lead wound around the teeth 412 with the insulator 42 interposed therebetween.

The stationary portion 2 includes the fixing member 70 disposed outside the bearing housing 22 in the radial direction. The stator 24 is fixed to the outer circumferential surface of the bearing housing 22 by the fixing member 70. The fixing member 70 is disposed above the stator 24 and outside the bearing housing 22 in the radial direction and fixes the position of the stator 24. Specifically, the lower surface of the fixing member 70 is in contact with the upper surface of the stator 24. The fixing member 70 is fixed at a position opposite the intermediate portion 221 of the bearing housing 22 in the radial direction.

The circuit board 25 is disposed above the base plate 21 and below the stator 24 so as to be substantially perpendicular to the center axis 9. The circuit board 25 is fixed to, for example, the insulator 42. An electric circuit for supplying a driving current to the coil 43 is mounted on the circuit board 25. An end portion of the lead that constitutes the coil 43 is electrically connected to a terminal disposed on the circuit board 25.

The rotary portion 3 according to the present embodiment includes the shaft 31, a fixing ring 32, a hub 33, a rotor magnet 34, and a rotor holder 35.

The shaft 31 is a columnar member disposed along the center axis 9. A material of the shaft 31 is, for example, metal such as stainless steel and the like. The shaft 31 is supported by the pair of bearings 23 so as to be rotatable about the center axis 9. An upper end portion of the shaft 31 is positioned above the bearing 23 on the upper side. The fixing ring 32 is a metal member that has a circular ring shape. The fixing ring 32 is fixed to the upper end portion of the shaft 31.

The rotor holder 35 is a member that has a circular ring shape and that holds the rotor magnet 34. A material of the rotor holder 35 is, for example, metal such as iron and the like. The hub 33 is a member that holds the rotor holder 35. The hub 33 includes a disc portion 331 and a cylinder portion 332. The disc portion 331 covers the upper side of the stator 24. The inner circumferential part of the disc portion 331 is fixed to the fixing ring 32. That is, the hub 33 is fixed to the shaft 31 with the fixing ring 32 interposed therebetween. The cylinder portion 332 extends downward from the outer circumferential part of the disc portion 331.

The rotor holder 35 is fixed to the inner circumferential surface of the cylinder portion 332. The rotor magnet 34 is fixed to the inner circumferential surface of the rotor holder 35. The rotor magnet 34 may be one magnet that has a circular ring shape or may be a plurality of magnets arranged in the circumferential direction. The outer end surface of each of the teeth 412 in the radial direction and the inner surface of the rotor magnet 34 in the radial direction are opposite each other in the radial direction with a small gap interposed therebetween. The inner surface of the rotor magnet 34 in the radial direction is magnetized such that the north pole and the south pole are alternately arranged in the circumferential direction.

When a driving current is supplied from the circuit board 25 to the coil 43 of the stator 24 in the motor 1, a magnetic flux is generated at each of the teeth 412. Then, torque in the circumferential direction is generated by a rotating magnetic field generated between each of the teeth 412 and the rotor magnet 34. As a result, the rotary portion 3 is rotated about the center axis 9 relative to the stationary portion 2.

Figure 3:
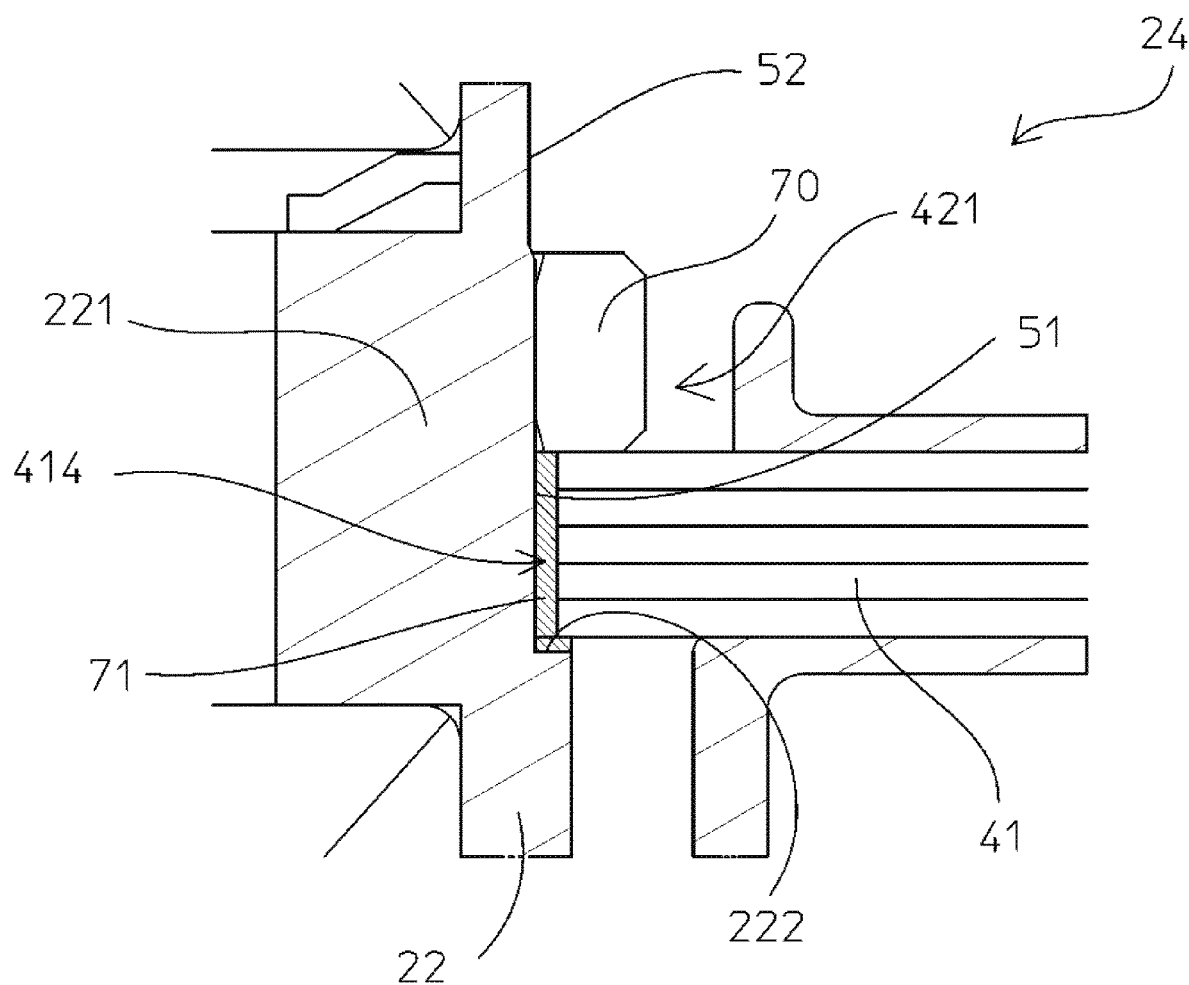
FIG. 3 is a partial sectional view of the bearing housing, a stator, and a fixing member.
Figure 4:
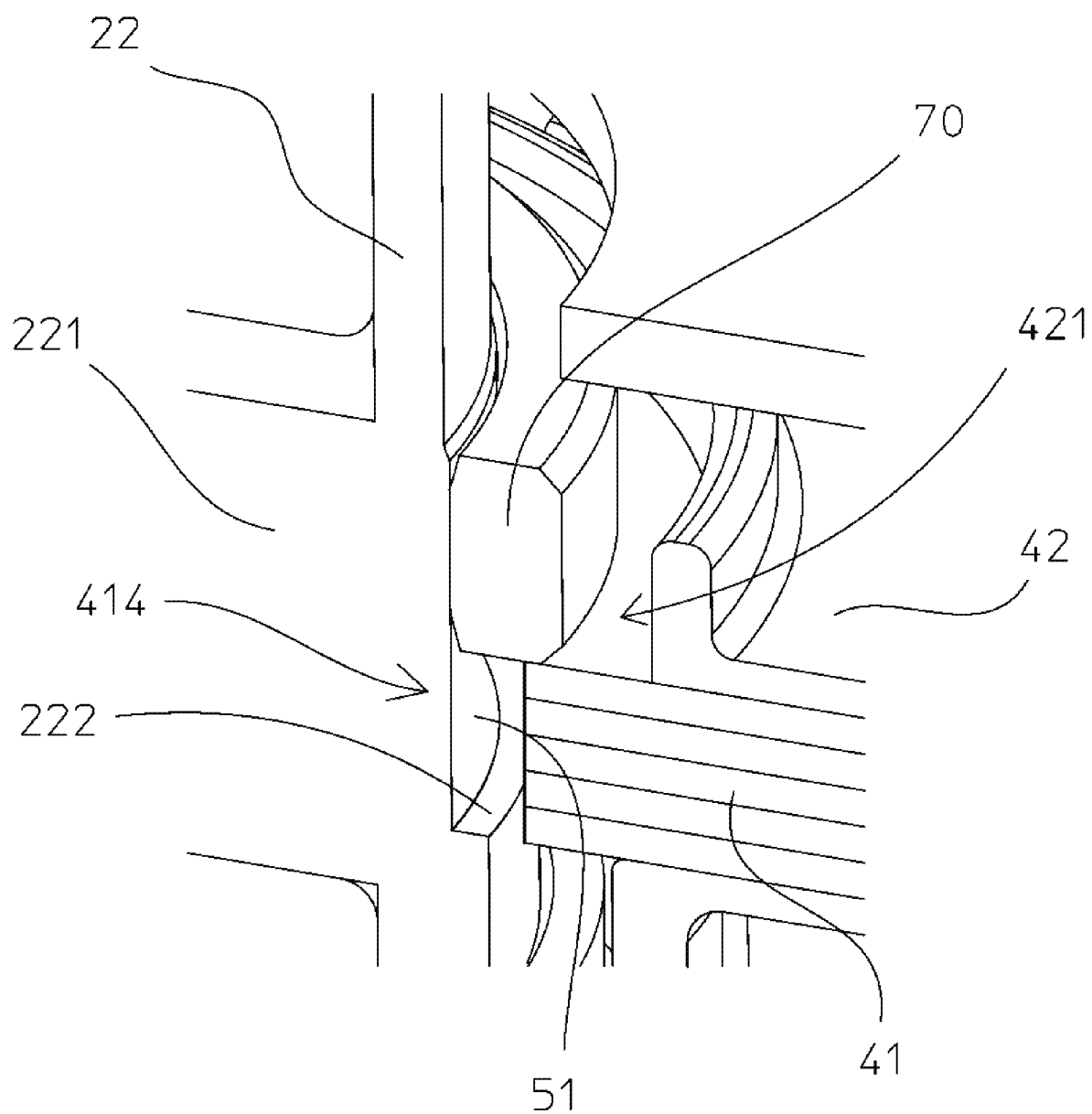
FIG. 4 is a partial perspective view of the bearing housing, the stator, and the fixing member, taken along a plane that includes a center axis.
Figure 5:
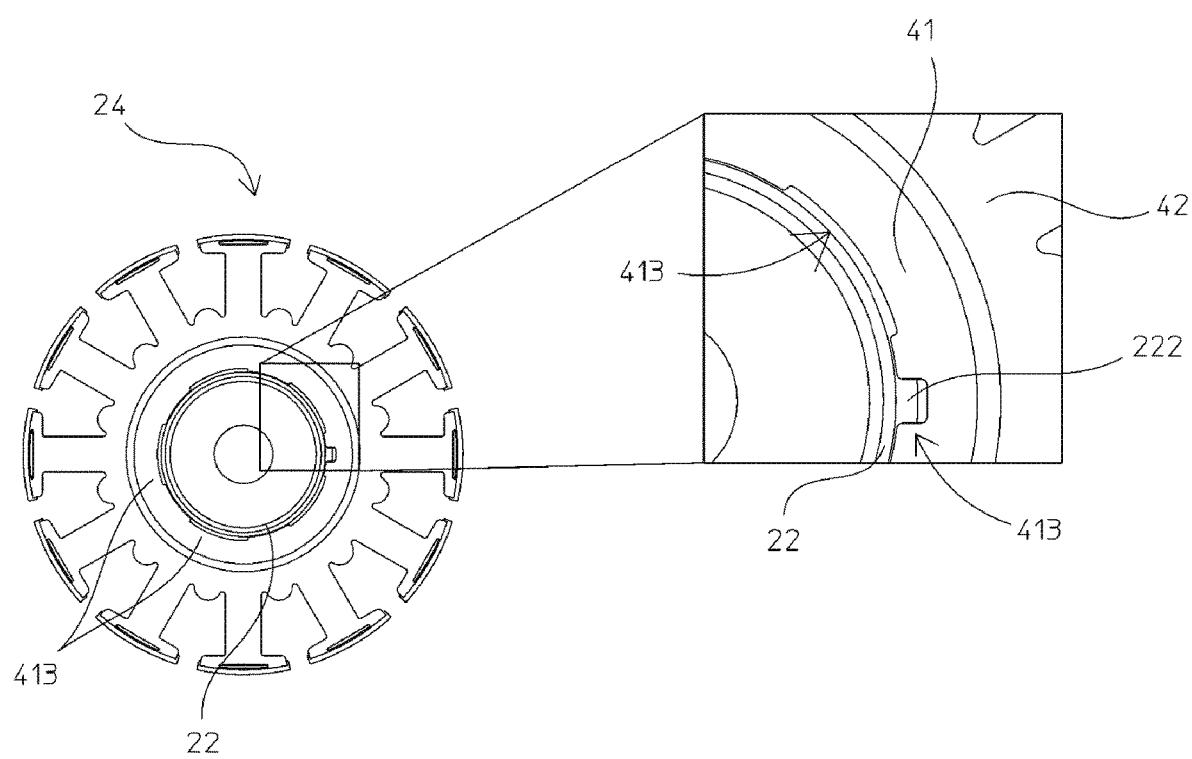
FIG. 5 is a top view of the bearing housing and the stator.

Next, a fixing structure of the bearing housing 22, the stator 24, and the fixing member 70 will be described in detail. FIG. 3 is a partial sectional view of the bearing housing 22, the stator 24, and the fixing member 70. FIG. 4 is a partial perspective view of the bearing housing 22, the stator 24, and the fixing member 70, taken along a plane that includes the center axis 9. FIG. 5 is a top view of the bearing housing 22 and the stator 24.

As illustrated in FIG. 2, the bearing housing 22 includes the first bearing holding portion 501, the second bearing holding portion 502, a first outer circumferential surface 51, a second outer circumferential surface 52, the intermediate portion 221, and a step surface 222. The first bearing holding portion 501 is a portion in which one of the bearings 23 is held inside the bearing housing 22. Specifically, the outer race of the bearing 23 is fixed to the inner circumferential surface of the bearing housing 22, which is the first bearing holding portion 501. In order to position the bearing 23 relative to the bearing housing 22 with high accuracy, the inner circumferential surface of the first bearing holding portion 501 is preferably processed accurately to be completely round and processed to have small surface roughness.

The second bearing holding portion 502 is a portion in which one of the bearings 23 is held inside the bearing housing 22. The second bearing holding portion 502 is positioned below the first bearing holding portion 501 in the axial direction. Specifically, the outer race of the bearing 23 is fixed to the inner circumferential surface of the bearing housing 22, which is the second bearing holding portion 502. Similarly to the inner circumferential surface of the first bearing holding portion 501, the inner circumferential surface of the second bearing holding portion 502 is preferably processed accurately to be completely round and processed to have small surface roughness.

The intermediate portion 221 is provided between the first bearing holding portion 501 and the second bearing holding portion 502 in the vertical direction. The bearing housing 22 has a cylindrical shape that passes through the center axis 9. The bearing housing 22 has a thickness in the radial direction. In the present embodiment, the thickness of the bearing housing 22 in the radial direction at the intermediate portion 221 is larger than the thickness of the bearing housing 22 in the radial direction at the first bearing holding portion 501. That is, the rigidity of the bearing housing 22 at the intermediate portion 221 is larger than the rigidity of the bearing housing 22 at the first bearing holding portion 501.

At least a portion of the first outer circumferential surface 51 is a portion of the outer circumferential surface of the bearing housing 22 at the intermediate portion 221. That is, a surface of at least a portion of the first outer circumferential surface 51 is a surface positioned outside the intermediate portion 221 in the radial direction. The first outer circumferential surface 51 is a portion of the outer circumferential surface of the bearing housing 22 opposite the stator core 41 in the radial direction. In addition, the first outer circumferential surface 51 is a portion of the outer circumferential surface of the bearing housing 22 opposite the fixing member 70 in the radial direction.

The second outer circumferential surface 52 is a portion of the outer circumferential surface of the bearing housing 22 along which the fixing member 70 passes when being inserted. That is, the second outer circumferential surface 52 is positioned above the first outer circumferential surface 51 in the axial direction. Here, the diameter of the first outer circumferential surface 51 with the center axis 9 as the center is larger than that of the second outer circumferential surface 52. The diameter of the second outer circumferential surface 52 is smaller than the inner diameter of the fixing member 70. Due to the diameter of the second outer circumferential surface 52 smaller than the inner diameter of the fixing member 70, it is possible to avoid damage of the outer circumferential surface of the bearing housing 22 and the bearing housing 22 itself during disposing the fixing member 70 at the first outer circumferential surface 51. A gap between the second outer circumferential surface 52 and the inner circumferential surface of the fixing member 70 is preferably sufficiently large. A large gap enables the fixing member 70 to be disposed on the upper surface of the stator 24 without catching the bearing housing 22.

In the present embodiment, the fixing member 70 is fixed to the bearing housing 22 by press-fitting. Specifically, the inner circumferential surface of the fixing member 70 is fixed by press-fitting to the first outer circumferential surface 51 of the outer circumferential surface of the bearing housing 22 positioned at the intermediate portion 221. The fixing member 70 is not necessarily fixed by press-fitting. For example, the fixing member 70 may be fixed to the bearing housing 22 by shrink-fitting. The intermediate portion 221 is a section in which the thickness of the bearing housing 22 in the radial direction is larger than that at the first bearing holding portion 501. The intermediate portion 221 has strength sufficient for fixing of the fixing member 70 by press-fitting. If the fixing member 70 is fixed to a portion, such as the first bearing holding portion, having a thin thickness in the radial direction, there is a possibility that the bearing housing 22 is deformed and the bearings 23 are also deformed. If the bearings 23 are subjected to deformation and stress, there is a possibility that the lifetime of the bearings 23 is affected. Therefore, it is possible to suppress deformation of the bearing housing 22 by fixing the fixing member 70 to the intermediate portion 221, which has sufficient strength.

In the present embodiment, the fixing member 70 is formed of a non-magnetic metal material and is a ring member that has an annular shape. Preferably, the material of the fixing member 70 is identical to that of the bearing housing 22. For example, a copper alloy material such as brass is used as the material of the bearing housing 22 and the fixing member 70. It is possible to prevent the fixing member 70 from coming off from the bearing housing 22 during heat-curing of the adhesive and an elastic member 71, which will be described later by using materials having identical linear expansion coefficients for the bearing housing 22 and the fixing member 70. Moreover, it is possible to fix the stator 24 to a predetermined location in the bearing housing 22, and thus, it is possible to suppress the displacement between the bearing housing 22 and the stator 24. Each of the bearing housing 22 and the fixing member 70 may be formed of a metal material, such as aluminum, or resin. In addition, it is possible to suppress a magnetic effect on the stator core 41 by using a non-magnetic metal material.

Further, it is possible to firmly fix the stator 24 to the bearing housing 22 by using a ring-shaped annular member as the fixing member 70. The fixing member 70 that has a ring shape is formed by cutting a rod-shaped or pipe-shaped metal material. The ring-shaped fixing member 70 may be formed by punching a plate-shaped material.

As illustrated in FIGS. 2, 3, and 4, the outer circumferential surface of the bearing housing 22 according to the present embodiment includes the step surface 222 that has a circular ring shape. The step surface 222 extends outward in the radial direction from a lower end portion of the first outer circumferential surface 51. A portion of the step surface 222 and a portion of the lower surface of the stator core 41 are opposite each other in the axial direction. The radius of the outer edge of the fixing member 70 with the center axis 9 as the center is larger than the radius of the outer edge of the step surface 222. The step surface 222 restricts the downward displacement of the stator 24 in the axial direction relative to the bearing housing 22.

The fixing member 70 is disposed above the stator 24. The stator 24 is disposed above the step surface 222 of the bearing housing 22. That is, the stator 24 is held by the fixing member 70 and the step surface 222 of the bearing housing 22 so as to be therebetween in the vertical direction, and fixed to the bearing housing 22 in this state. It is possible to suppress the displacement of the stator 24 relative to the bearing housing 22 by restricting the vertical movement of the stator 24.

In the present embodiment, the fixing member 70 is disposed above the stator core 41. The lower surface of the fixing member 70 is in contact with the upper surface of the stator core 41. In other embodiments, the lower surface of the fixing member 70 may be in contact with the upper surface of the insulator 42.

As illustrated in FIG. 3, the bearing housing 22 is opposite the stator core 41 in the radial direction with a gap 414 therebetween. The gap 414 is filled with the elastic member 71. Specifically, the elastic member 71 is interposed between the first outer circumferential surface 51 of the bearing housing 22 and the inner circumferential surface of the stator core 41. The elastic member 71 is, for example, a silicon-based elastic adhesive. The elastic member 71 has a function of fixing the stator core 41 to the bearing housing 22 and a function of absorbing vibration generated in the stator core 41. Transmission of vibration from the stator core 41 to the bearing housing 22 is suppressed by using the elastic member 71. As a result, vibration and noise during driving of the motor 1 is reduced.

The elastic member 71, however, sometimes takes a long time for curing after application. Thus, it is required to prevent the displacement of the stator 24 relative to the bearing housing 22 after the elastic member 71 is applied until the elastic member 71 is cured. In the present embodiment, as described above, the lower surface of the fixing member 70 is in contact with the upper surface of the stator core 41. In addition, the inner circumferential surface of the fixing member 70 is in contact with the first outer circumferential surface 51 of the bearing housing 22. Thus, it is possible to suppress the displacement of the stator 24 relative to the bearing housing 22 during curing of the elastic member 71.

As illustrated in FIG. 3, the fixing member 70 covers the upper side of the gap 414. Specifically, the outer diameter of the fixing member 70 is larger than the gap 414, which is opposite the bearing housing 22 and the stator core 41 in the radial direction. The fixing member 70 that is large enough to cover the upper side of the gap 414 makes it possible to prevent the elastic member 71 from flowing out from the upper portion of the stator 24 during curing of the elastic member 71. In addition, it is possible to retain the elastic member 71 inside the gap 414.

As illustrated in FIG. 5, the stator core 41 according to the present embodiment includes a plurality of recessed portions 413 in the inner circumferential surface thereof. The plurality of recessed portions 413 are arranged at equal spaces in the circumferential direction. Each of the recessed portions 413 is recessed outward in the radial direction from the inner circumferential surface of the stator core 41. A portion of the elastic member 71 is positioned inside the recessed portions 413. Providing the inner circumferential surface of the stator core 41, as described above, with the recessed portions 413 that retain the elastic member 71 makes it possible to suppress variation in the amount of the elastic member 71 that is interposed between the bearing housing 22 and the stator core 41. The inner circumferential surface of the stator core 41 is in direct contact, at a portion thereof other than the recessed portions 413, with the first outer circumferential surface 51 of the bearing housing 22. As a result, it is possible to position the stator core 41 relative to the bearing housing 22 with higher accuracy. However, the portion other than the recessed portions 413 of the inner circumferential surface of the stator core 41 is not necessarily in direct contact with the first outer circumferential surface 51 of the bearing housing 22; a gap may be interposed therebetween. In addition, the elastic member 71 may be disposed in the gap.

As illustrated in FIG. 3, a portion of the elastic member 71 may be interposed between the lower surface of the stator core 41 and the step surface 222. As a result, transmission of vibration from the lower surface of the stator core 41 to the bearing housing 22 is suppressed. Therefore, it is possible to further reduce vibration and noise during driving of the motor 1.

As illustrated in each of FIG. 3 and FIG. 4, the stator 24 has, on the upper surface thereof, an annular groove portion 421 that is recessed downward in the axial direction. In the present embodiment, the groove portion 421 is a portion surrounded by the first outer circumferential surface 51, which is the outer circumferential surface of the bearing housing 22, the upper surface of the stator core 41, and the inner surface of the insulator 42. At least a portion of the fixing member 70 is housed in the groove portion 421. The lower surface of the fixing member 70 is in contact with the upper surface of the stator core 41. Providing the groove portion 421 on the upper side of the stator 24 and housing the fixing member 70 inside the groove portion 421 enable a reduction in the thickness of the motor. For example, the fixing member 70 is positioned inside the coil 43 in the radial direction. A gap between the bearing housing 22 and the coil 43 in the radial direction is a void in the structure of the motor 1. Disposing the fixing member 70 in the void makes it possible to fix the stator 24, at a position lower than the height of the coil 43 in the axial direction, to the bearing housing 22. As a result, it is possible to reduce the thickness of the motor 1.

One embodiment as an example of the present disclosure is described above; however, the present disclosure is not limited to the aforementioned embodiment.

Figure 6:
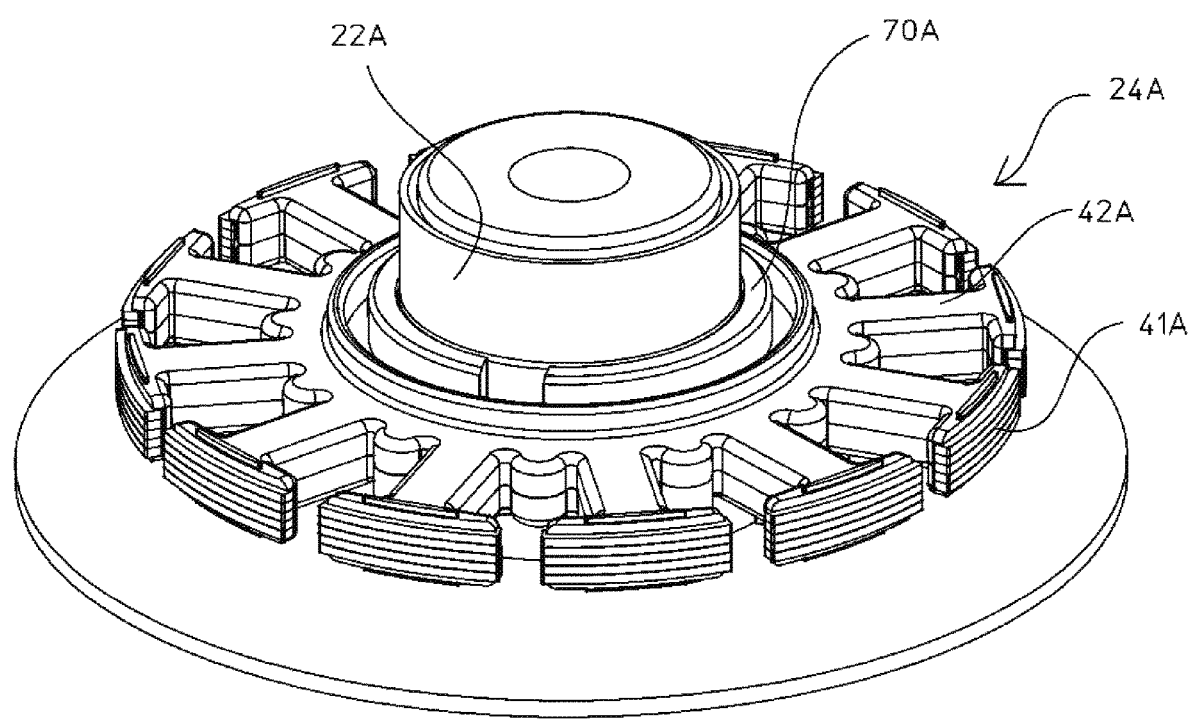
FIG. 6 is a perspective view of a bearing housing, a stator, and a fixing member according to a modification.

FIG. 6 is a perspective view of a bearing housing 22A, a stator 24A, and a fixing member 70A according to one modification as an example. In the example in FIG. 6, the fixing member 70A is a member that has a ring shape in which a portion is partially broken. Namely, the ring shape is a C-ring shape in which a portion is open. It is possible to reduce pressure of press fitting the fixing member 70A to the bearing housing 22A by employing the C ring shape for the fixing member 70A. A reduction in the pressure of press fitting makes it possible to dispose the fixing member 70A at an appropriate location in the stator 24A by preventing the fixing member 70A from separating from the stator 24A.

In the aforementioned embodiment, the elastic adhesive is interposed between the bearing housing and the stator core. However, an adhesive of a different type may be disposed between the bearing housing and the stator core. Moreover, the bearing housing and the stator core may be in direct contact with each other with no adhesive interposed therebetween. However, in a case in which an adhesive, such as an elastic adhesive or a heat-curable adhesive, that takes a long time for curing is used, it is required to suppress the displacement of the stator core relative to the bearing housing until the curing is completed. Therefore, the present disclosure is particularly useful.

In addition, as illustrated in FIG. 4 and FIG. 5, the recessed portions 413 recessed outward in the radial direction from the inner circumferential surface of the stator core 41 may be recessed outward in the radial direction further than the outer edge of the step surface 222. In this case, the gap 414 between the bearing housing 22 and the stator core 41 extends toward the lower side of the stator core 41. The gap 414 forms a through hole that extends to the lower surface of the stator core 41, which makes it possible to control the amount of the elastic member 71. Namely, it is possible to discharge an excessive amount of the elastic member 71 to the outside of the gap 414 through the through hole when the elastic member 71 of an amount more than the space volume of the gap 414 is applied.

The application of the motor according to the present disclosure is not particularly limited. The motor according to the present disclosure may be, for example, a fan motor that includes an impeller attached to a rotary portion.

The shape of each of small portions of each member may differ from the shape illustrated in the drawings of the present disclosure. The components presented in the embodiment and the modification described above may be combined together, as appropriate, as long as there is no inconsistency.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor comprising:
   a stationary portion; and
   a rotary portion that is supported so as to be rotatable about a vertically extending center axis relative to the stationary portion,
   wherein the stationary portion includes
      a cylindrical bearing housing that extends in an axial direction around the center axis, and
      a stator and a fixing member that are disposed outside the bearing housing in a radial direction,
   wherein the stator includes
      a stator core that is a magnetic body,
      an insulator that is an insulating body that covers at least a portion of the stator core, and
      a lead that is wound around the stator core with the insulator interposed therebetween,
   wherein the bearing housing includes
      a first bearing holding portion and a second bearing holding portion that hold two bearings, and
      an intermediate portion that is positioned between the first bearing holding portion and the second bearing holding portion in a vertical direction,
   wherein a lower surface of the fixing member is in contact with an upper surface of the stator,
   wherein the fixing member is fixed at a position opposite the intermediate portion in the radial direction.

2. The motor according to claim 1,
   wherein the bearing housing is opposite the stator core in the radial direction with a gap interposed therebetween, and
   wherein the gap is filled with an elastic member.

3. The motor according to claim 2,
   wherein the stator core includes a plurality of recessed portions in an inner circumferential surface thereof, the plurality of recessed portions being recessed outward in the radial direction, and
   wherein a portion of the elastic member is positioned inside the recessed portions.

4. The motor according to claim 2, wherein the fixing member covers an upper side of the gap.

5. The motor according to claim 2,
   wherein the bearing housing includes a step surface that has a circular ring shape, the step surface being opposite a lower surface of the stator core in the axial direction, and
   wherein a portion of the elastic member is interposed between the lower surface of the stator core and the step surface.

6. The motor according to claim 1, wherein the bearing housing and the fixing member are formed of an identical non-magnetic metal material.

7. The motor according to claim 1, wherein the fixing member is a ring member that has an annular shape.

8. The motor according to claim 1, wherein the fixing member is a ring member that has an annular shape in which a portion is open.

9. The motor according to claim 1, wherein a thickness of the bearing housing in the radial direction at the intermediate portion is larger than a thickness of the bearing housing in the radial direction at the first bearing holding portion.

10. The motor according to claim 1,
    wherein an outer circumferential surface of the bearing housing includes a first outer circumferential surface on which the fixing member is disposed and a second outer circumferential surface that is positioned above the first outer circumferential surface, and
    wherein a diameter of the first outer circumferential surface with the center axis as a center is larger than a diameter of the second outer circumferential surface.

11. The motor according to claim 1,
    wherein the bearing housing includes a step surface that has a circular ring shape, the step surface being opposite a lower surface of the stator core in the axial direction, and
    wherein a radius of an outer edge of the fixing member with the center axis as a center is larger than a radius of an outer edge of the step surface.

12. The motor according to claim 1,
    wherein the stator includes an annular groove portion on the upper surface of the stator, the groove portion being recessed downward in the axial direction, and
    wherein at least a portion of the fixing member is housed in the groove portion.

13. The motor according to claim 12,
    wherein the groove portion is formed by the outer circumferential surface of the bearing housing, the upper surface of the stator core, and an inner circumferential surface of the insulator, and
    wherein the lower surface of the fixing member is in contact with the upper surface of the stator core.

* * * * *